(No Model.)

G. F. FILLEY.
Cooking Stove.

No. 236,425.  Patented Jan. 11, 1881.

Attest:
Charles Pickles
Solon U. Sapp.

Inventor:
Giles F. Filley
by C. D. Moody
atty.

UNITED STATES PATENT OFFICE.

GILES F. FILLEY, OF ST. LOUIS, MISSOURI.

COOKING-STOVE.

SPECIFICATION forming part of Letters Patent No. 236,425, dated January 11, 1881.

Application filed September 7, 1880. (No model.)

*To all whom it may concern:*

Be it known that I, GILES F. FILLEY, of St. Louis, Missouri, have made a new and useful Improvement in Cooking-Stoves and Ranges, of which the following is a full, clear, and exact description, reference being had to the annexed drawings, making part of this specification, in which—

Figure 1:
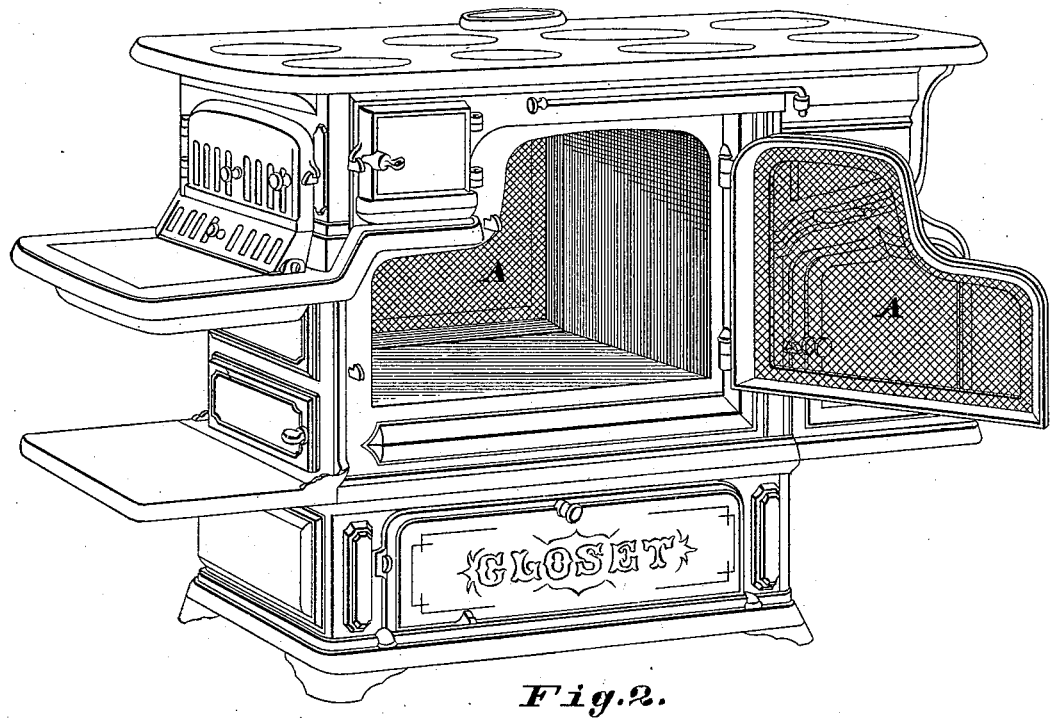
Figure 2:
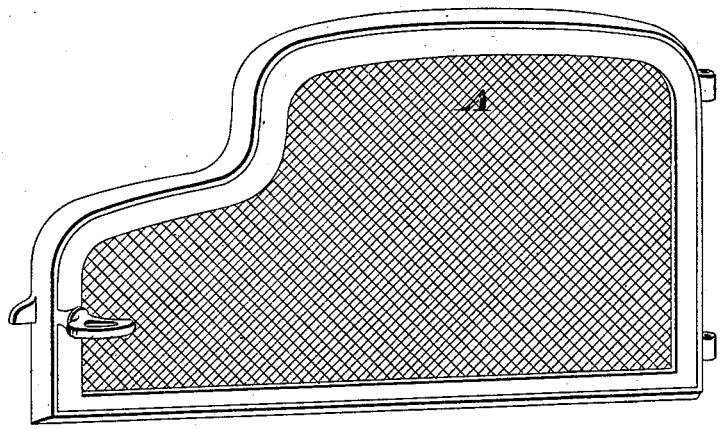

Figure 1 is a view, in perspective, of a cooking-stove having the improvement, and Fig. 2 a view of the oven-door.

The same letters denote the same parts.

To expedite the baking process, heated air-currents have been passed through the ovens of cooking-stoves; and, to utilize the heat of a cooking-stove when not needed for baking, the fire-place has been furnished with a hollow fire-back, through which air is drawn, there heated, and thence, for heating purposes elsewhere, been discharged through the uppermost part of the oven into a discharge-flue. A small register, also, for the purpose of tempering the heat within the oven, has been inserted in the oven-door; but, saving such instances as these, the oven of a cooking-stove or range has been constructed upon the supposition that the outer air must be excluded from the oven when in use. The more thorough the exclusion the more effective the oven was supposed to be in its operation. To this end stove-manufacturers have not only provided the ovens of stoves and ranges with imperforate doors, but have taken especial pains to accurately fit the doors, so that the outer air cannot in the least degree enter or leave the oven at the door joints, and, under the belief that the heat must be confined in the oven, they are in the habit of lining the oven-doors, as well as packing them with non-heat conductors. I have discovered that these theories are erroneous. It is not essential to keep the outer air, at atmospheric temperatures, from directly entering the oven of a cooking-stove or range during its use. On the contrary, such an air-circulation through the oven not only does not interfere with the cooking, but it is highly advantageous in improving the flavor of the articles being cooked. It is not only a vehicle for carrying moisture into the oven and to the articles being cooked, but it is valuable as a means for keeping the temperature of the oven below that point at which the juices and moisture of the articles vaporize. It is like cooking in the open Dutch oven or roasting before the fire. Nor is it important to prevent the escape of heat through the oven-doors. I have learned, by actual and repeated trials, that all the ordinary articles of food are cooked in a superior manner in an oven having doors filled with gauze, and that the heat radiating from the various flues surrounding the oven and passing directly into the articles being cooked is amply sufficient for the operation without needing to be supplemented by any body of heat that may be accumulated within the oven by keeping it tightly closed, or by the introduction into the oven of heated air-currents.

In carrying out the improvement wire-gauze or finely-perforated metal is inserted in the oven door or doors, and to obtain the best results the perforated portion should extend up and down the upper part of the door, and up and down the lower part of the door; and if desired, the entire door may be perforated, saving a sufficient strip along the edges to serve as a frame for holding the perforated portion A, Fig. 1. The air enters the oven through the lower portion of the perforation, and passes out from the oven through the upper portion of the perforation, thereby causing an air-circulation through the oven. When the oven has doors upon opposite sides, as in cooking-stoves, both doors may be perforated. The gauze allows the air to enter, and also serves as a guard against improper interference.

I am aware that the doors to the fuel-chambers in heating-stoves have been perforated.

I claim—

1. A cooking-stove or range oven having one or both of its doors provided with wire-gauze or finely-perforated metal, A, as and for the purpose described.

2. A cooking-stove or range oven having one or both of its doors provided with wire-gauze or finely-perforated metal, such gauze or metal extending up and down the upper part, and also up and down the lower part, of the door, for the purposes described.

GILES F. FILLEY.

Witnesses:
C. D. MOODY,
CHARLES PICKLES.